G. C. ATKINSON.
WATERING TROUGH.
APPLICATION FILED JUNE 23, 1916.
1,237,447.
Patented Aug. 21, 1917.
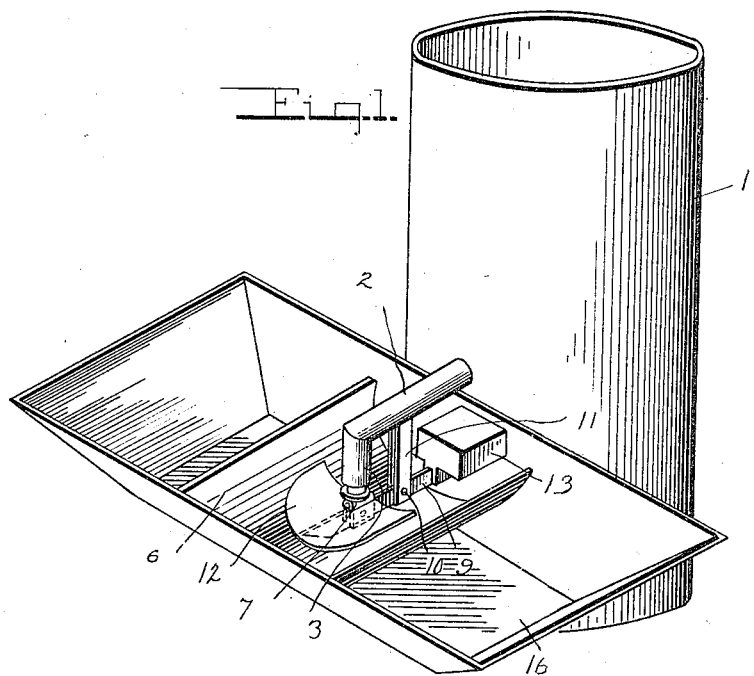
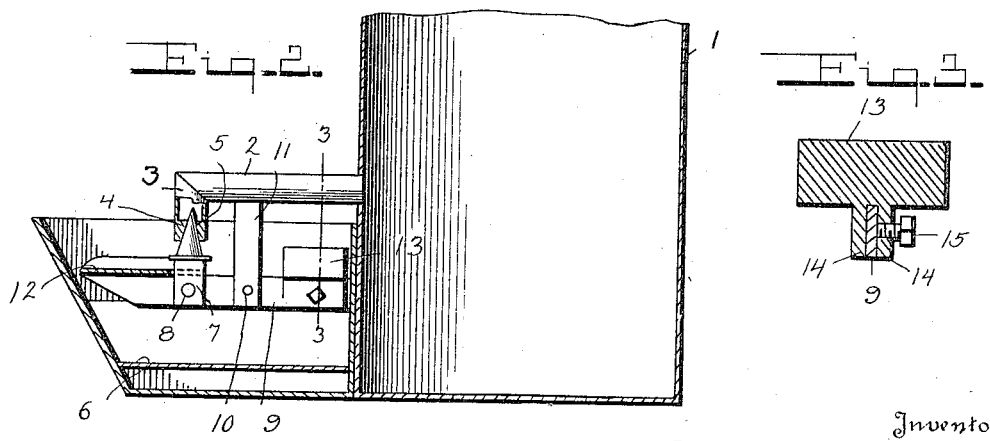
Witness
R. N. Jones
Robt. Meyer.
Inventor
G. C. Atkinson·
By
A. Randolph Jr.,
Attorney

UNITED STATES PATENT OFFICE.

GEORGE C. ATKINSON, OF GEORGETOWN, TEXAS.

WATERING-TROUGH.

1,237,447.  Specification of Letters Patent.  Patented Aug. 21, 1917.

Application filed June 23, 1916.  Serial No. 105,433.

*To all whom it may concern:*

Be it known that I, GEORGE C. ATKINSON, a citizen of the United States, residing at Georgetown, in the county of Williamson and States of Texas, have invented certain new and useful Improvements in Watering-Troughs; and I do hereby declare the following to be a full, clear, and exact description of the invention, such as will enable others skilled in the art to which it appertains to make and use the same.

This invention relates to a trough for watering various types of domestic animals or stock such as horses, cows, hogs, sheep or the like, and the primary object of the invention is to provide a novel form of valve structure for controlling the flow of drinking water from a reservoir or retaining tank into the drinking trough, which is operable by the animal, so that each and every animal will have fresh water to drink.

A further object of this invention is to provide a weight for automatically closing the valve after an animal leaves the trough and also to provide an overflow trough into which the water flows from the drinking trough for preventing the waste water from falling on the ground and forming a mud puddle about the trough.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views and in which:—

Figure 1 is a perspective view of the improved watering trough.

Fig. 2 is a fragmentary vertical section through the water trough, and

Fig. 3 is a section on the line 3—3 of Fig. 2.

Referring more particularly to the drawings, 1 designates the reservoir or retaining tank into which the water is pumped from any suitable source and 2 designates the outlet pipe for the tank 1. The pipe 2 is angled, for providing a vertical portion 3 in the lower outlet end of which is formed a valve seat 4. A cone valve 5 is provided for seating in the seat 4 for cutting off the flow of water through the pipe 2 into the drinking trough 6. The valve cone 5 is carried by a plate 7 which is pivotally connected as shown at 8 to a pivoted bar 9. The bar 9 is pivotally mounted as shown at 10 upon the lower end of a pair of spaced plates 11 which plates have their upper ends secured in any suitable manner to the outlet pipe 2 of the tank 1. A curved operating plate 12 is mounted upon the outer end of the bar 9 and a balancing weight 13 is adjustably mounted upon the inner end of the bar 9, inwardly of its pivotal point 10. The balancing weight 13 has depending ears 14 formed thereon which are spaced upon opposite sides of the bar 9, and slidably mounted thereon to permit of the adjustment of the weight 13 along the length of the bar for properly balancing the pivotal movement of the bar and for automatically receiving the cone valve 5 after it has been unseated by downward pressure upon the plate 12. A set screw 15 is provided for holding the weight in adjusted positions along the bar 9.

An overflow trough 16 is provided into which the surplus water from the drinking trough 6 flows for preventing the overflow water from flowing upon the ground and forming a mud puddle about the drinking trough.

When an animal desires to drink, it forces the plate 12 downwardly, with its nose or its mouth which will unseat the valve cone 5 and permit the water to flow from the tank 1 through the outlet pipe 2 and the angled portion 3 into the drinking trough 6. Any surplus water which flows into the trough 6 will overflow the sides of the trough into the overflow trough 16. When the animal has had sufficient water and leaves the trough, the weight 13 will move the bar 9 to its normal horizontal position, and cause the seat of the cone valve 5 in the valve seat 4, for cutting off the supply of water. The cone valve 5 is arranged so that it will never be completely out of the valve seat 4.

What is claimed is:—

A watering trough of the class described including a retaining tank, a supporting trough, a drinking trough located centrally within the supporting trough, a substantially L-shaped outlet pipe having the end of its longer arm connected to and communicating with the retaining tank, its opposite end positioned within the drinking trough, a pair of ears depending downwardly from the underside of the longer arm of said pipe, a valve rod pivotally supported in the lower ends of the ears centrally thereof, a valve seat arranged on the interior of the end of the shorter arm of said pipe, a valve cone carried by one end of said valve rod, a weight carried by opposite end of said valve rod, said weight adapted to normally seat said valve in the outlet pipe, a plate carried by the outer end of said pivoted valve rod adjacent the valve and adapted to be engaged by an animal for pivotally moving the valve rod for unseating the valve cone from the valve seat as and for the purpose specified.

In testimony whereof I affix my signature in presence of two witnesses.

GEORGE C. ATKINSON.

Witnesses:
F. D. LOVE,
W. H. DAVIS.

Copies of this patent may be obtained for five cents each, by addressing the "Commissioner of Patents. Washington, D. C."